No. 726,593. PATENTED APR. 28, 1903.
E. THOMSON.
ELECTRIC CONTROL MECHANISM.
APPLICATION FILED OCT. 29, 1900.
NO MODEL. 2 SHEETS—SHEET 1.

WITNESSES
Henry O. Westendarp
Dugald McKillop

INVENTOR
Elihu Thomson
by Albert G. Davis
Attorney

No. 726,593. PATENTED APR. 28, 1903.
E. THOMSON.
ELECTRIC CONTROL MECHANISM.
APPLICATION FILED OCT. 29, 1900.
NO MODEL. 2 SHEETS—SHEET 2.

WITNESSES.
Henry Westendarp
Dugald McKillop.

INVENTOR.
Elihu Thomson
by Albert G. Davis
Attorney

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC CONTROL MECHANISM.

SPECIFICATION forming part of Letters Patent No. 726,593, dated April 28, 1903.

Application filed October 29, 1900. Serial No. 34,685. (No model.)

*To all whom it may concern:*

Be it known that I, ELIHU THOMSON, a citizen of the United States, residing at Swampscott, county of Essex, State of Massachusetts, have invented certain new and useful Improvements in Electric Control Mechanism, of which the following is a specification.

One feature of the invention herein described relates to an adjunctive circuit-changing device useful in connection with electric controllers or other hand-operating mechanism. It is, however, not limited to use in this particular relation. The device may be used to cut resistance into or out of circuit step by step and may be used in connection with electric-motor controllers for performing the desired variations of resistance. When so used, I employ a locking device whereby the controller is locked during the time the device is cutting resistance out of circuit and is only unlocked after the resistance has been removed, or vice versa, as the case may be.

I have shown my invention as embodied in a system of control whereby a controller is used for connecting two motors in series or in parallel. In this case the step-by-step changes of resistance are effected, not by means of contacts on the controller-cylinder, but by the independent movement of the separate circuit-changing device which I employ. This device is electromechanically actuated and is brought into operation by the controller by which it is connected into circuit when its operation is desired and disconnected when not needed. Such in a general way is the nature of my invention, the scope of which will be more particularly pointed out in the claims appended thereto.

For a more detailed understanding of my invention and its mode of operation reference is to be had to the following description, taken in connection with the accompanying drawings, in which—

Figure 1:
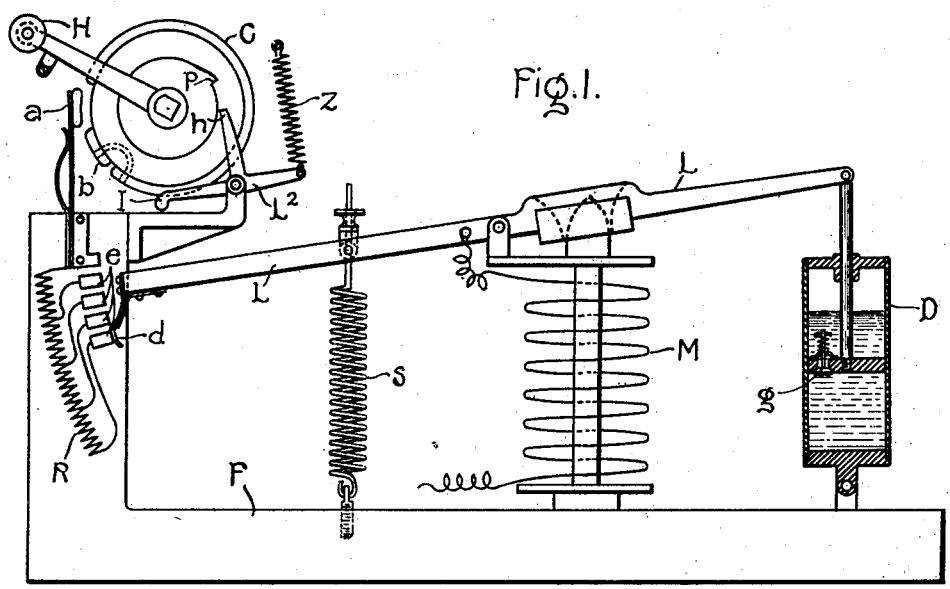
Figure 2:
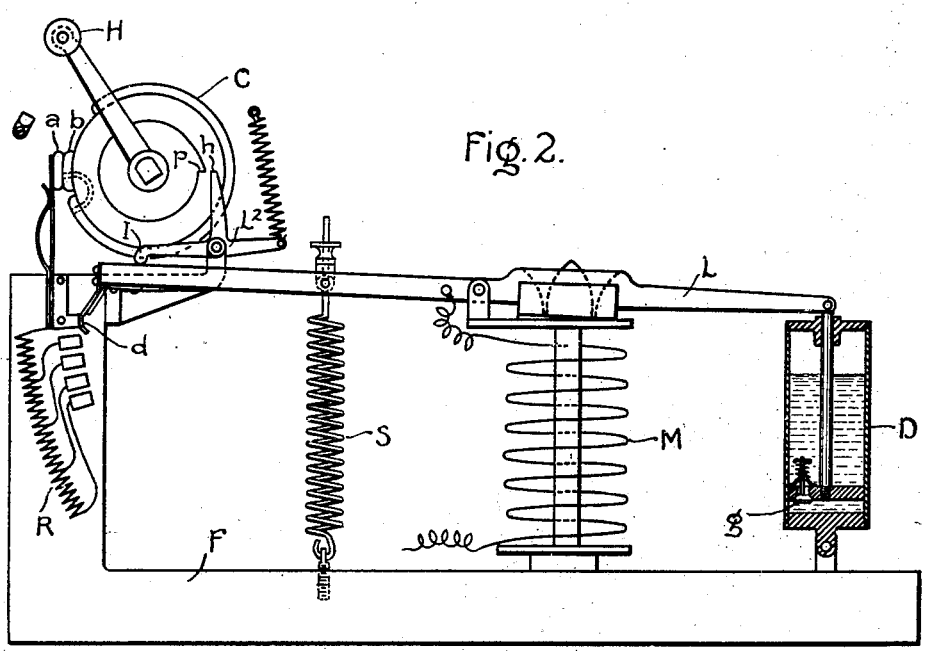

Figure 1 is a diagrammatic view of a circuit-closing device arranged in accordance with my invention and coöperatively associated with a controller-cylinder. Fig. 2 represents a different position of the parts of the arrangement shown in Fig. 1. Figs. 3 to 8, inclusive, are conventional diagrams showing how the controller and adjunctive device shown in Fig. 1 may be used for the series-parallel operation of electric motors.

Referring to Fig. 1, H represents the handle of a controller, the cylinder of which is shown at C. This cylinder is provided with contacts arranged according to the scheme shown in Figs. 3 to 8, these contacts coöperating with contact-fingers, also indicated in the figures mentioned. One of these fingers (shown at *a* in Fig. 1) coöperates with the contact *b* on the controller-cylinder to connect in circuit the resistance R and the winding of the magnet M. This magnet acts upon a pivoted armature L, one end of which is provided with a contact-finger *d*, which as the armature moves about its axis slides over a series of fixed contacts *e*, connected to suitably-spaced points in the resistance R. A spring S, connected at one end to the armature-lever L and at the other to the supporting-frame F, serves to urge the armature-lever toward one of its extreme positions, in which the resistance R is completely cut into circuit with the winding of the magnet M. When the magnet M is energized, the armature-lever is moved in the opposite direction, so as to cut out the resistance, this motion, however, being rendered comparatively slow by means of a dash-pot D or other suitable device. The piston of this dash-pot is provided with a check-valve *g*, which is closed while the armature-lever is being attracted by its magnet, thus rendering the motion of the lever slow, and opened as the lever moves in the opposite direction. The result is that the resistance R when cut into circuit is then slowly cut out of circuit step by step, but on the return motion of the armature-lever is rapidly inserted.

When the controller-handle H is moved to its first position, a stop P brings up against one arm *h* of a three-armed lever L². A spring Z normally urges the arm *h* into the path of the stop P. When the armature L is attracted by the magnet M, one end of the armature-lever brings up against a projecting end of the arm I of the three-armed lever L², thereby rotating the lever L² about its axis and withdrawing the arm *h* from engagement with the stop P.

During the passage of the contact $d$ over the fixed contacts $e$ of the resistance R the controller is thus locked from movement and is only unlocked, as described, upon the completion of the circuit-changing action of the armature L.

Fig. 2 shows the position of parts after the magnet M has been energized and the circuit-changing lever-armature L moved thereby to one of its extreme positions. In this position one end of the lever is shown in engagement with a projecting end of the arm I of the lever $L^2$. This forcible engagement is sufficient to move the arm $h$ out of locking engagement with the stop P on the controller. The controller is thus free to be moved into succeeding positions, as may be desired.

In order to make the speed of movement of the armature L of the same degree of slowness when attracted by the magnet M, whatever be the current flowing in the winding of the magnet, I may proportion the core of the magnet so as to be saturated by a comparatively small current, whereby if any larger current should flow the attractive force of the magnet would not be greatly increased and would therefore not cause much increase in speed of movement of the armature.

The magnetically-actuated circuit-changing device which I have above described is obviously capable of application in many relations where it is desired that the circuit changes should be performed independently of manual control. In Figs. 3 to 8 of the drawings I have shown the application of my device to a series-parallel system of motor control, the device acting in this instance to vary the resistance in circuit when such variation is desired. In such a system my device is advantageous in that it allows the contacts for changing the resistance in circuit to be located elsewhere than upon the controller-cylinder, thereby lessening the complication of parts of the controller with its attendant advantages. It is also advantageous in that the variation of resistance is independent of manual control.

Figure 3:
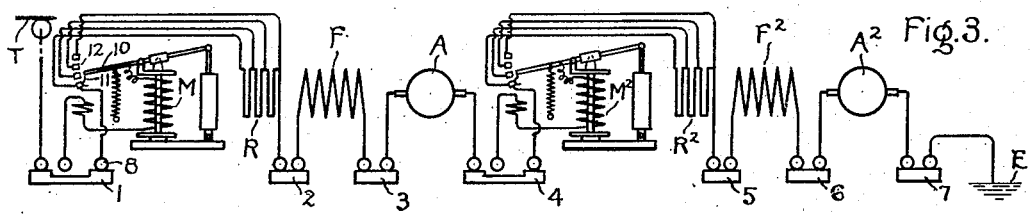
Figure 4:
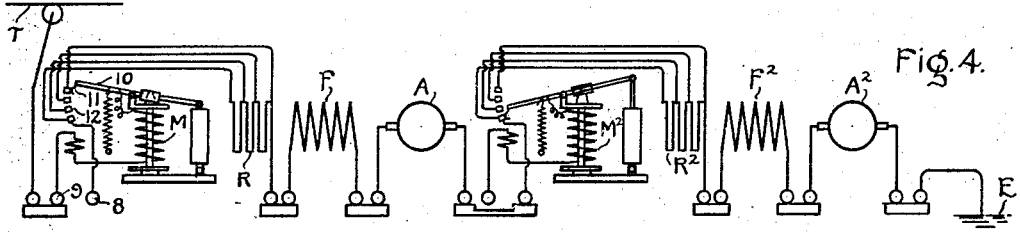
Figure 5:
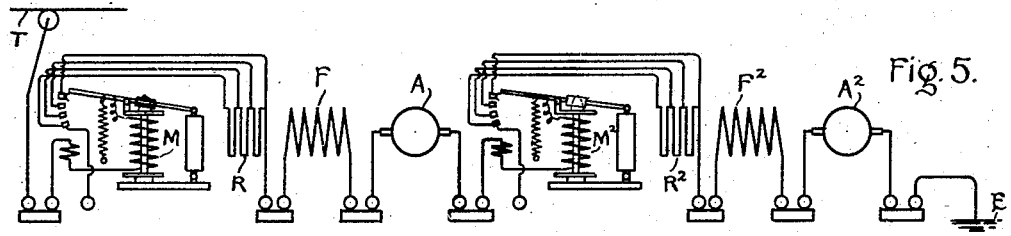
Figure 6:
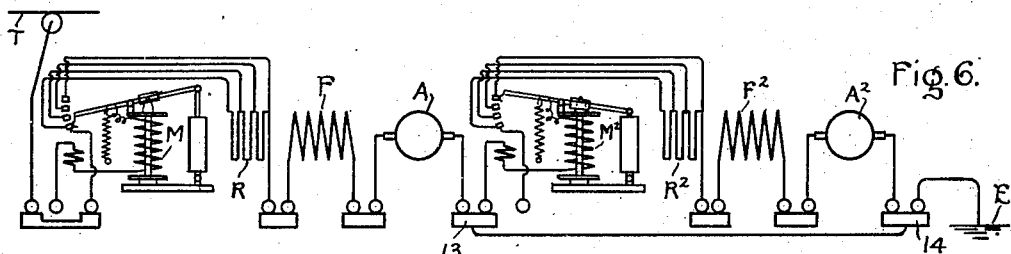
Figure 7:
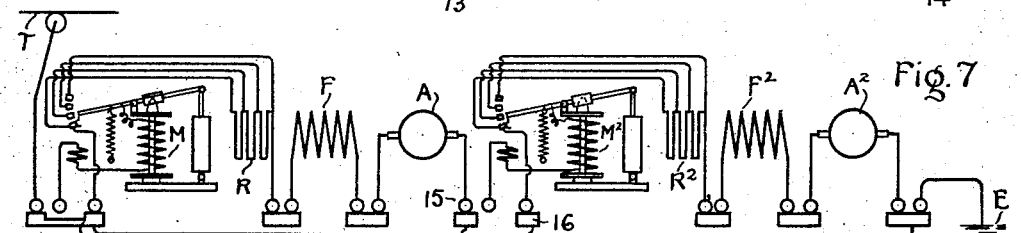
Figure 8:
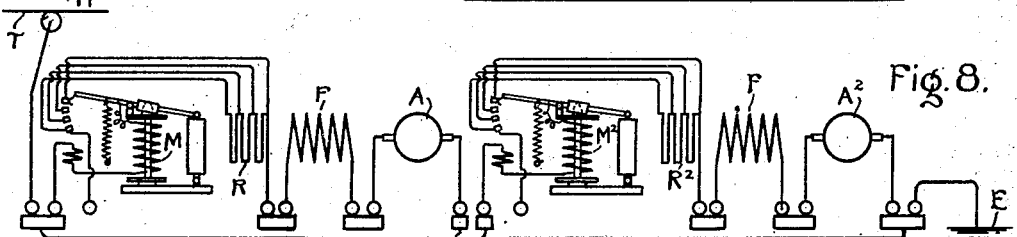

In Fig. 3 two motors are shown, the armatures of which are indicated, respectively, at A $A^2$ and the fields at F $F^2$. The resistances for the two motors are shown at R and $R^2$, each of these resistances being provided with a magnetically-actuated circuit-changing device for slowly cutting the resistance out of circuit. All of the parts thus mentioned are cut into or out of circuit and their circuit relations changed by means of contacts upon the controller-cylinder operating in conjunction with contact-fingers in the usual manner. In the first position of the controller the contacts 1, 2, 3, 4, 5, 6, and 7, coöperating with the contact-fingers which bear thereon, as shown, operate to connect the motors and resistances all in series between the trolley T and the ground-return E, the magnetic circuit-changing devices M and $M^2$ being in this position out of circuit. In the next position of the controller (shown in Fig. 4) the connections are the same as in Fig. 3, except that the magnetic circuit-changing device M is connected in circuit, the connection being effected by disconnecting the terminal 8 of the resistance R and substituting the terminal 9 of the winding of the magnet M, the circuit, however, being still completed through the resistance R by reason of the connection of the other end of the winding through the arm 10 and moving contact 11. As soon as this connection is made the moving contact 11 is caused to slowly pass over the fixed contacts 12 in the manner already described, the resistance R being thus slowly cut out of circuit. The final position of the parts is shown in Fig. 4. In the next position of the controller the same transposition of the terminals is made with respect to the magnetic circuit-changing device $M^2$ and the resistance $R^2$, which it controls. After the device $M^2$ has thus been actuated the connections are as represented at Fig. 5, in which both motors are connected directly in series between the trolley and ground without the interposition of any resistance. The further circuit changes effected by the controller are made with a view to connecting the motors in parallel relation with each other. Preparatory to attaining this object the controller first shunts one of the motors—as, for example, the motor $A^2$—this connection being effected by means of the contacts 13 14, which are electrically connected together. Simultaneously therewith the magnet M is cut out of circuit, thus causing the rapid insertion of the resistance R. The contact 14 being grounded thus serves to connect the motor A in series with resistance R directly between the ground and the trolley T, as will readily be seen from Fig. 6. In the next position of the controller the resistance $R^2$ is disconnected from the terminal 15 of the motor A and by means of the electrically-connected contacts 16 17 is put into direct connection with the trolley T, all of which will be readily apparent in Fig. 7. The two motors are thus connected in parallel with each other between trolley and ground, the respective resistances of the two motors being, however, connected in circuit with the motors in order to prevent a too-sudden rush of current. In order to increase the torque of the motors, the next step of the controller acts to insert the magnetic circuit-controlling devices for the resistances, the connections being readily apparent in Fig. 8. As soon as these devices are put in circuit their armatures are slowly attracted and the resistances slowly cut out of circuit, the motors being then directly connected in the supply-circuit without the interposition of resistance, thereby receiving the full voltage of the supply-circuit and developing their maximum torque.

It is obvious that my invention is capable of may other applications than that shown and of course may be applied to alternatingcurrent circuits as well as to those fed by direct current. Instead of effecting the variation of resistance the circuit-changing device may cause variations of reactance, variations in the number of turns of a winding, as well as other circuit changes which it may be found desirable to make independent of manual control.

What I claim as new, and desire to secure by Letters Patent of the United States, is—

1. The combination of a controller, a mechanically-actuated locking device or detent for the controller, a resistance, and magnetic means for successively varying said resistance and releasing said locking device.

2. The combination of a controller, a mechanically-actuated locking device or detent for the controller, a resistance, and slow-acting magnetic means for successively varying said resistance and releasing said locking device.

3. The combination of a controller, a locking device or detent for said controller, a resistance adapted to be connected in circuit by said controller, and means for automatically cutting said resistance out of circuit and releasing said locking device or detent.

4. The combination of a controller, a current-limiting device adapted to be connected in circuit by said controller, electrically-controlled means for disconnecting said current-limiting device, a detent for the controller, and means for releasing the detent when the said current-limiting device is cut out of circuit.

5. The combination of an electric circuit, a current-limiting device, manually-actuated means for connecting the current-limiting device in circuit, means independent of manual control for removing the current-limiting device, and a locking device or detent for the manually-actuated means.

6. The combination of a controller, a resistance adapted to be connected in circuit by said controller, slow-acting means for disconnecting said resistance, and a detent for said controller brought into operation while said resistance or part thereof is in circuit.

7. The combination of an electric circuit, a resistance, manually-actuated means for connecting the resistance in circuit, magnetic means for removing the resistance, and a locking device or detent, independent of manual control, for the manually-actuated means.

8. The combination of an electric circuit, a current-limiting device, manually-actuated means for connecting the current-limiting device in circuit, magnetic means for removing the resistance, and a locking device or detent released by said magnetic means.

9. In a system of motor control, the combination of a plurality of electric motors, manually-actuated means for connecting the motors in series and in parallel, resistances adapted to be connected in circuit with said motors, and means independent of manual control for varying said resistances.

10. In a system of motor control, the combination of a plurality of electric motors, manually-actuated means for connecting the motors in series and in parallel, resistances adapted to be connected in circuit with said motors, and means independent of manual control for slowly cutting out said resistances.

11. The combination of a controller, a device adapted to be connected in circuit by said controller, means independent of manual control for cutting said device out of circuit, and a detent or locking device for said controller operative until said device has been cut out of circuit.

12. The combination of a controller, a device adapted to be connected in circuit by said controller and provided with a plurality of contacts, means independent of manual control for cutting said device out of circuit, and a detent or locking device for said controller operative until said device has been cut out of circuit.

In witness whereof I have hereunto set my hand this 26th day of October, 1900.

ELIHU THOMSON.

Witnesses:
DUGALD MCKILLOP,
JOHN MCMANUS.